(12) United States Patent
Liang

(10) Patent No.: US 7,187,362 B2
(45) Date of Patent: Mar. 6, 2007

(54) HOT-KEY MOUSE FOR THE SAME

(76) Inventor: Hui-Hu Liang, No. 3, Pao Chi Lane, Chung Ya Tsun, Siu Shui Hsiang, Changhua Hsien (TW)

( * ) Notice: Subject to any disclaimer, the term of this patent is extended or adjusted under 35 U.S.C. 154(b) by 460 days.

(21) Appl. No.: 10/670,357

(22) Filed: Sep. 26, 2003

(65) Prior Publication Data
US 2005/0068297 A1    Mar. 31, 2005

(51) Int. Cl.
*G09G 5/08* (2006.01)
(52) U.S. Cl. .................. 345/163; 345/168; 341/21
(58) Field of Classification Search .............. 345/156, 345/157, 163, 168; 341/21–23
See application file for complete search history.

(56) References Cited

U.S. PATENT DOCUMENTS 5,910,798 A * 6/1999 Kim ..................... 345/163

2006/0033714 A1 * 2/2006 Boldin ................. 345/163

* cited by examiner

*Primary Examiner*—Richard Hjerpe
*Assistant Examiner*—Kimnhung Nguyen
(74) *Attorney, Agent, or Firm*—Troxell Law Office PLLC

(57) ABSTRACT

A hot-key mouse is to position several hot keys on both sides of a scroll wheel of the mouse, excepting remaining original design of the left and the right mouse buttons, the hot keys are positioned adjacent to the scroll wheel and between the left and the right mouse buttons without hindering the operations of the left and the right mouse buttons. Those hot keys are pre-defined by functions for either the left or the right hand user to operate without changing another type of mouse. The invention enables the hot-key mouse to be commonly used by either the left or the right hand user, in addition, to reduce the manufacturing cost.

4 Claims, 2 Drawing Sheets

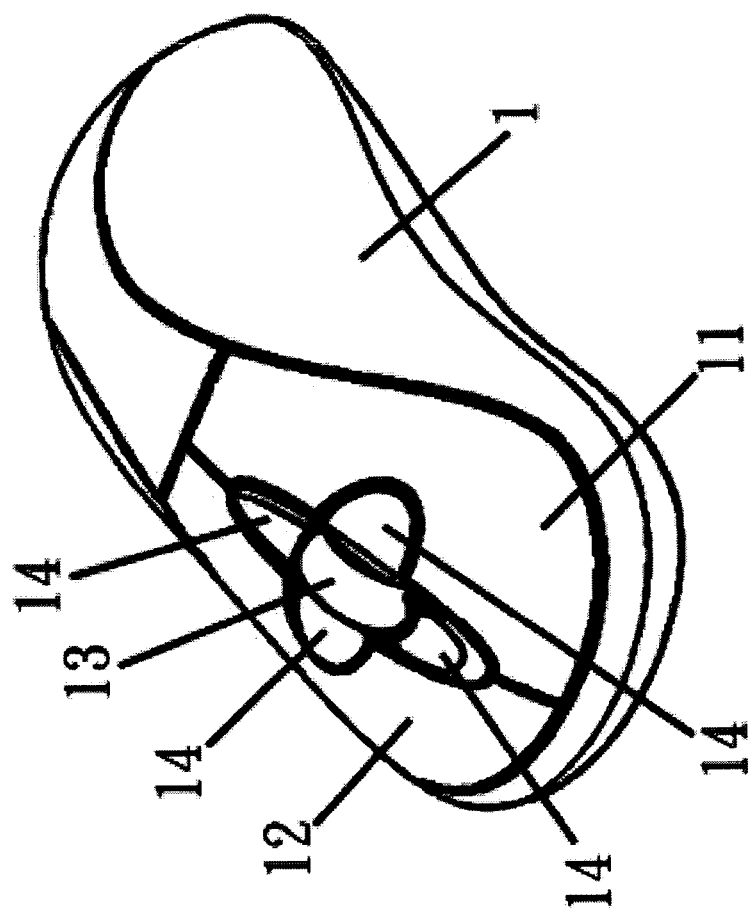
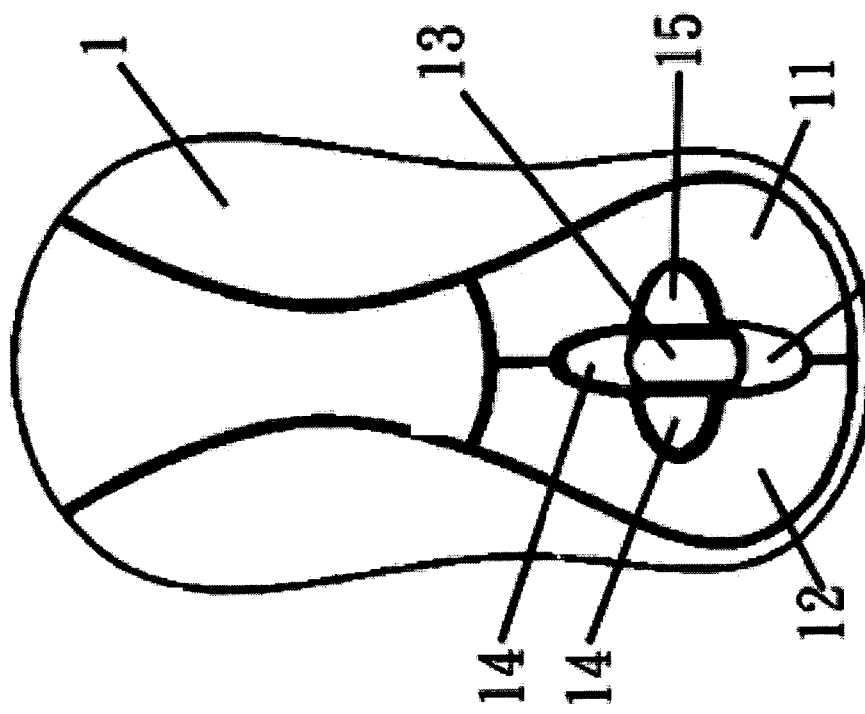

HOT-KEY MOUSE FOR THE SAME

FIELD OF THE INVENTION

The present invention relates to a hot-key mouse, and more particularly, to a technology of a hot-key mouse that applies several hot keys to be positioned between the left and the right mouse buttons and to be adjacent to the position of a scroll wheel to fit either the right or the left hand for convenient navigation.

BACKGROUND OF THE INVENTION

Generally, a hot-key mouse is specially designed for a user to operate by his/her left or right hand according to personal habitual behavior. With reference to FIG. 3, a prior art of a mouse 1' with hot keys 14' is designed for a right hand user; the hot keys 14' are installed at left lateral side of the mouse 1' near the position to be held by the thumb; on the contrary, a mouse of prior art designed for a left hand user has the hot keys installed on the right lateral side of the mouse. Generally, a conventional hot-key mouse has the hot keys positioned on the left and the right sides of the left and the right mouse buttons 11' and 12' of the mouse 1'; whereas each type of mouse has a scroll wheel 13' installed thereon, the scroll wheel 13' is a essential accessory to a mouse.

SUMMARY OF THE INVENTION

I. Problems To Be Solved
  1. A conventional mouse design positions hot keys on the lateral sides of the left or the right mouse button of a mouse in order to evade the left and the right mouse buttons. The hot keys are established near the positions to be held by the thumb, so as to cause inconvenience of moving the mouse by its user;
  2. The positions of the hot keys on a mouse are based on the habitual behavior of a user using the left or the right hand, therefore, a mouse that is used by either the left or the right hand user is specially made by positioning the hot keys on either the left or right lateral side of the mouse. Such designs relatively increase the cost, in addition, set constraint on the usages of hot-key mouses; moreover, the manufacture of two kinds of mouses with hot keys further increases the mouse inventory.

II. The Methods For Solving The Problems
  1. The invention appropriately positions the hot keys adjacent to the scroll wheel and between the left and the right mouse buttons forming a state of having the hot keys in the middle of the left and the right mouse buttons but without affect the operations of the left and the right mouse buttons. The invention, therefore, enables a user to hold the mouse by the thumb and the little finger, in addition, to operate those hot keys by the index finger, the middle finger and the ring finger; either a left or a right hand user can easily operate the mouse;
  2. The hot keys of the invention are not particularly positioned to accommodate to the habitual behavior of either a left or a right hand user; the invention can be manufactured by a unitary specification to reduce the manufacturing cost and the inventory of different mouses.

BRIEF DESCRIPTION OF THE DRAWINGS

FIG. 1 is a perspective view of the invention;
FIG. 2 is a vertical view of the invention.

DETAILED DESCRIPTION OF THE PREFERRED EMBODIMENTS

Figure 3:
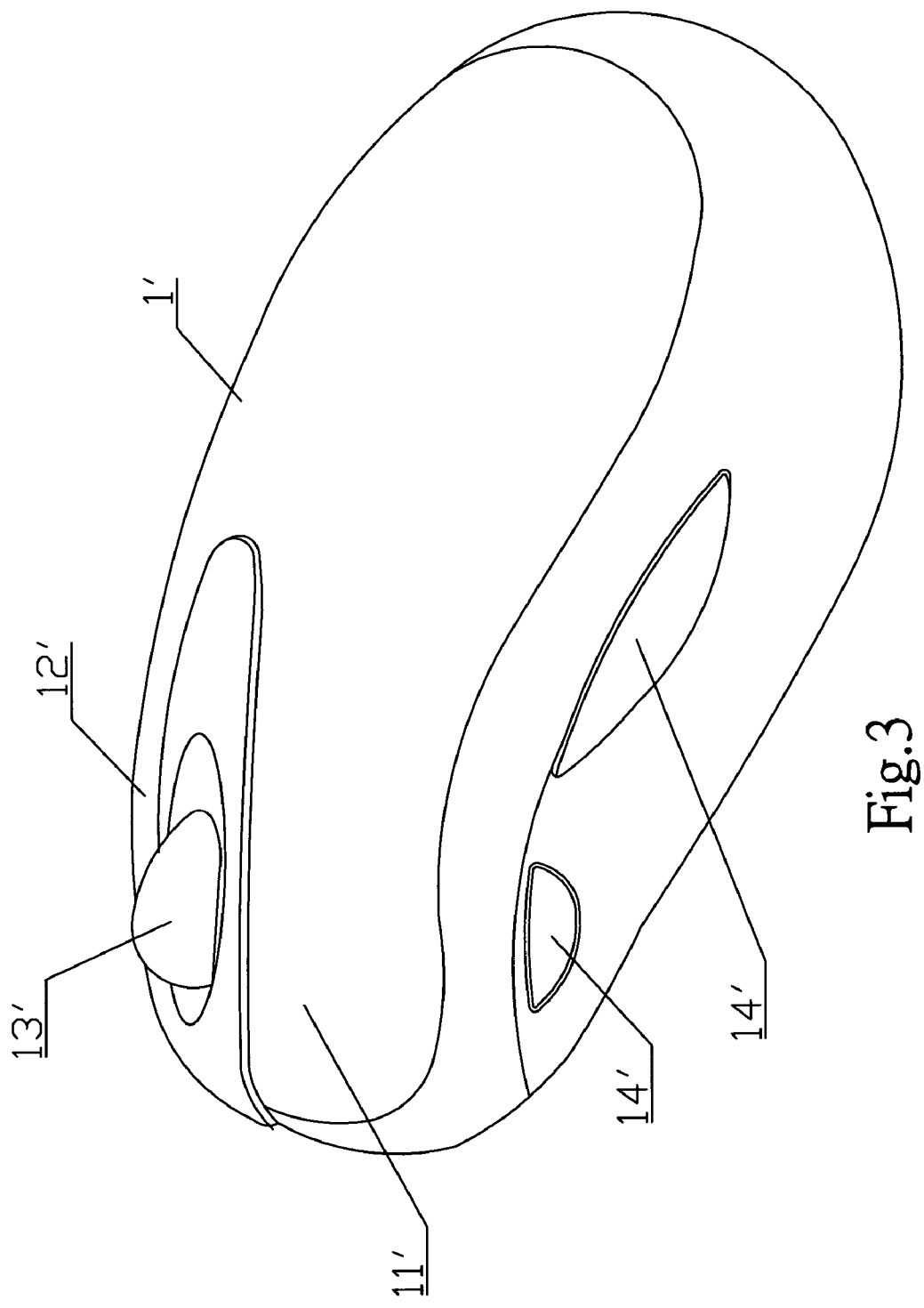
FIG. 3 is a perspective view of a hot-key mouse of a prior art.

The hot-key mouse of the invention can be more fully understood by reading the following detailed description of a preferred embodiment, with reference made to the accompanying drawings.

With reference to FIGS. 1 and 2, pre-defined hot keys 14 are respectively installed at appropriate positions around a scroll wheel 13 of a mouse 1, the left and the right mouse buttons 11 and 12 of the mouse 1 are respectively positioned on the both lateral sides thereof, thereby the mouse 1 with the hot keys 14, can be directly controlled by the index finger, the middle finger and the ring finger by either a left or a right hand user for convenient navigation.

In addition, those hot keys 14 of the invention are positioned between the left and the right mouse buttons 11 and 12 of the mouse and adjacent to the scroll wheel 13. Those hot keys 14 and the scroll wheel 13 form a state of having the hot keys in the middle of both the left and the right mouse buttons, the hot-key mouse enables either a left or a right hand user to easily operate the mouse. Moreover, the mouse with the hot keys 14 are positioned adjacent to the scroll wheel 13 with shapes of radiated petals, in order to add an overall artistic effect on the mouse.

What is claimed is:

1. A hot-key mouse having hot keys with pre-defined functions comprising:
  a left and right mouse button on an upper surface of the mouse;
  a scroll wheel between the left and right buttons;
  a first hot key above the scroll wheel;
  a second hot key below the scroll wheel;
  a third hot key on one side of the scroll wheel;
  a fourth hot key on another side of the scroll wheel.

2. the hot-key mouse of claim 1, wherein the several hot keys are shaped as geometrical shapes or decorative patterns.

3. The hot-key mouse of claim 2, wherein the hot keys are positioned as petals radiating outwards from the scroll wheel.

4. A hot-key mouse of claim 1, wherein the hot keys and the left and the right mouse buttons are all configured to fit either a left or a right hand user.

* * * * *